United States Patent
Appenzeller

(10) Patent No.: US 10,819,093 B2
(45) Date of Patent: Oct. 27, 2020

(54) STRIPPING HEAD AND METHOD FOR THE OPERATION THEREOF

(71) Applicant: Schleuniger Holding AG, Thun (CH)

(72) Inventor: Reto Appenzeller, Thun (CH)

(73) Assignee: Schleuniger AG, Thun (CH)

( * ) Notice: Subject to any disclaimer, the term of this patent is extended or adjusted under 35 U.S.C. 154(b) by 520 days.

(21) Appl. No.: 15/292,416

(22) Filed: Oct. 13, 2016

(65) Prior Publication Data
US 2017/0125988 A1    May 4, 2017

(30) Foreign Application Priority Data

Oct. 28, 2015 (EP) .................................... 15191973

(51) Int. Cl.
*H02G 1/12* (2006.01)
*G02B 6/245* (2006.01)

(52) U.S. Cl.
CPC .......... *H02G 1/1265* (2013.01); *G02B 6/245* (2013.01); *H02G 1/12* (2013.01); *H02G 1/127* (2013.01)

(58) Field of Classification Search
CPC .... B28D 1/226; H02G 1/1265; H02G 1/1256; G02B 6/245
USPC ............ 30/90.1, 90.4; 83/614, 869; 81/9.51, 81/9.42
See application file for complete search history.

(56) References Cited

U.S. PATENT DOCUMENTS

| | | | |
|---|---|---|---|
| 4,638,692 A | 1/1987 | Bensussen | |
| 4,745,828 A | 5/1988 | Stepan | |
| 4,942,789 A | 7/1990 | Hoffa | |
| 5,243,882 A * | 9/1993 | Stepan | .................. G02B 6/245 |
| | | | 81/9.42 |

(Continued)

FOREIGN PATENT DOCUMENTS

| | | |
|---|---|---|
| CN | 103346507 A | 10/2013 |
| EP | 0195932 B1 | 11/1998 |

(Continued)

OTHER PUBLICATIONS

First Office Action for corresponding CN Application No. 201610959762.3, 28 pages, dated Aug. 2, 2019.

(Continued)

*Primary Examiner* — Laura M Lee
(74) *Attorney, Agent, or Firm* — Matthew B. Dernier, Esq.

(57) ABSTRACT

An apparatus for removing at least one layer of the cladding of electrical conductors or light guides is provided with at least two clamping jaws which can be moved towards the conductor for fixing the conductor in the longitudinal direction. Furthermore, a rotary stripping head is provided which comprises at least one stripping blade which can rotate about the axis of rotation of the stripping head and which can be moved radially in relation to the axis of rotation for cutting through at least one layer of the cladding of the conductor and at least two centring jaws which can be moved radially in relation to the axis of rotation of the stripping head and which are arranged directly at the blade or blades for centring the conductor in the axis of rotation of the stripping head. At least one first drive system is provided for the centring jaws and at least one separate second drive system which can be actuated independently of the first drive system is provided for the stripping blade or blades.

14 Claims, 2 Drawing Sheets

(56) References Cited

U.S. PATENT DOCUMENTS

| | | | | |
|---|---|---|---|---|
| 5,361,384 A | * | 11/1994 | Stepan | G02B 6/245 |
| | | | | 385/134 |
| 5,596,802 A | * | 1/1997 | Koch | H02G 1/1265 |
| | | | | 29/720 |
| 6,286,393 B1 | * | 9/2001 | Messer | H02G 1/1265 |
| | | | | 81/9.41 |
| 6,360,430 B1 | * | 3/2002 | Stepan | H02G 1/1265 |
| | | | | 29/33 F |
| 7,597,030 B2 | * | 10/2009 | Stepan | H02G 1/1265 |
| | | | | 81/9.42 |
| 2018/0138672 A1 | * | 5/2018 | Messina | H02G 1/1265 |

FOREIGN PATENT DOCUMENTS

| | | |
|---|---|---|
| JP | 0370412 A | 3/1991 |
| WO | 9813907 A1 | 4/1998 |
| WO | 03100935 A1 | 12/2003 |
| WO | 2005046015 A1 | 3/2005 |
| WO | 20061005690 A1 | 9/2006 |
| WO | 2010061303 A2 | 6/2010 |

OTHER PUBLICATIONS

European Search Report for corresponding EP Application No. 15191973.5-1809, 7 pages, dated Apr. 29, 2016.

* cited by examiner

STRIPPING HEAD AND METHOD FOR THE OPERATION THEREOF

CROSS REFERENCE TO RELATED APPLICATIONS

This application claims the priority of the European Application No. EP15191973.5, filed on Oct. 28, 2015, which is here incorporated in its entirety by reference expressly and explicitly to the whole and in all arbitrary parts, for all intents and purposes, in the same way as if identically completely incorporated in the present application.

BACKGROUND

The invention relates to an apparatus for removing at least one layer of the cladding of electrical conductors or light guides according to the disclosed embodiments.

Such an apparatus comprises at least two clamping jaws which can be moved towards the conductor for fixing the conductor in the longitudinal direction and a rotary stripping head which comprises at least one stripping blade which can be rotated about the axis of rotation of the stripping head and which can be moved radially in relation to the axis of rotation for cutting through at least one layer of the cladding of the conductor and at least two centring jaws which can be moved radially in relation to the axis of rotation of the stripping head and which are arranged directly at the blade or blades for centring the conductor in the axis of rotation of the stripping head.

The invention also relates to a method for operating such an apparatus. For executing this method the apparatus is additionally provided in the inner region of the stripping head with a stop for the end of the conductor as a trigger for the machining process.

The process steps describe the clamping of the conductor by means of the clamping jaws whereby the stripping head is set in rotation as well as the centring of the conductor by means of the centring jaws and the incision into the cladding of the conductor by means of the at least one stripping blade.

WO 2010061303 A2 discloses a cable cut and strip machine for coaxial or continuous optical fibre cables comprising a rotating stripping unit consisting of two cutting elements and a radially movable centring jaw unit. Both units have a drive unit. The centring units are arranged in the immediate vicinity of the cutting elements. Instead of clamping jaws for fixing the conductor, rollers are provided which can also act as axial fixing.

EP 0195932 B1 discloses the feeding of the centring jaws and also the blades of a rotary unit via respectively one axially displaceable cone, where this cone acts directly on the ends of axially parallel levers facing away from the blades. The levers are in principle movable independently of one another, even to a different extent but the cones are coupled with the result that during closing a relative movement of the blades with respect to the centring jaws is only possible after closing the centring jaws and an opening movement of the centring jaws is only possible after opening the blades. On the other hand, an independent actuation of centring jaws and blade carriers is not possible.

WO 20061005690 A1 discloses the actuation of the centring jaws and blades by means of an arrangement of coaxial shafts which co-rotate with the rotary head about the axis thereof at a distance, these shafts being actuated by means of control levers which for their part are acted upon by control cones displaceable in the axial direction. The control cone is motor-actuated and controlled for the blade-carrying shaft so that the blades can be closed arbitrarily far, i.e. can be brought close to the cable axis. The control cone for the centring jaws has a spring as drive which makes this second control cone track the first control cone for the blades but presses the centring jaws with a maximum force predefined by the spring constant against the cable. Thus, on the one hand the centring jaws can only be actuated when the stripping blades are also guided onto the cable and furthermore the actuation of the centring jaws is always coupled to the actuation of the blades so that no actual independence of the actuation from the centring and cutting of the cable insulation is given.

WO 2005046015 A1 discloses the independent action of centring jaws and blades of a rotary unit during stripping. The actuation both of the centring jaws and also the blades is brought about by means of disks with spiral guides which through relative twisting bring about the radial movement thereof in fixed guides for the jaws or blades. The same functional principle is also described in WO 9813907 A1. As a result of the rotary disks in which the blades and centring jaws are guided these arrangements are very cumbersome and as a result of the large diameter require high actuation moments. Furthermore, at least three drives are required for accomplishing the relative rotary movements of respectively four disk-shaped bodies—respectively two disks for centring jaws or blade which can be twisted relative to one another.

Use of the principle of axially moving cones or wedges in order to bring about a radial movement or a radial moment is also provided in U.S. Pat. No. 4,638,692 A in a cable clamping device. The clamping of the cable is brought about by the axial movement of wedges themselves which are exposed to moments.

Finally JP H0370412 A describes a stripping unit in which a carriage with a guide and centring for the cable is provided independently of the movement of the cutting device.

SUMMARY

It was therefore the object of the present invention to provide an apparatus for removing at least one layer of the cladding of electrical conductors or light guides as described initially, which with a smaller installation size and low expenditure for the number and dimensioning of the drives enables a completely independent actuation of centring jaws and blades and thus appreciably expands the possible applications of the apparatus. A further object was a method for operating such an apparatus.

The object is solved by the features of the independent claims. Advantageous further developments are set out in the figures and in the dependent patent claims.

In order to solve this object, it is provided according to the invention that at least one first drive system for the centring jaws and at least one separate second drive system for the stripping blade or blades which can be actuated independently of the first drive system is provided. In this case, the stripping blade or blades and the drive system including the drive motor is mounted on a withdrawal carriage which can be moved by a motor substantially parallel to the axis of rotation of the stripping head. This enables extreme flexibility in the machining process, where the centring jaws can also be used as a twisting tool to twist strands independently of stripping. Since the drive motor can be co-moved during the withdrawal movement for the conductor cladding separated by means of the stripping blade, the design of the drive system is substantially simpler since no distance variations need to be compensated in the drive system itself.

An embodiment according to the invention is preferred in which each drive system comprises a drive motor which is positioned at a distance from the centring jaws and the stripping blade or blades and in which each drive system further comprises an actuating arrangement which transmits the drive force of the motor to the centring jaws or the or each stripping blade. Thus, the drive motor can be designed and placed optimally structurally and relating to assembly whilst the striping head can be kept very slender, small and light.

Preferably the actuating arrangement comprises a rotary lever which carries a stripping blade or a centring jaw and which is attached in non-rotating manner to a shaft which is located parallel to the axis of rotation of the stripping head, which is located radially at a distance therefrom and co-rotates about this axis of rotation, which shaft can be actuated by the drive motor.

An advantageous embodiment of the invention provides that the shaft for a stripping blade is guided coaxially with the shaft for the centring jaw and both shafts can be twisted towards one another.

A preferred embodiment of the invention is further characterized in that at its end opposite the rotary lever the shaft has a pressure lever mounted in non-rotating manner which cooperates with a sloping face which extends coaxially to the axis of rotation of the stripping head, co-rotates coaxially with this and is adjustable coaxially in the direction of the axis of rotation by means of the drive motor.

According to the invention, the pressure lever is subjected to a force in the direction of the sloping face by means of an elastic element, preferably a tension spring.

Also within the framework of the invention is an embodiment of the apparatus in which the sloping face is mounted in non-rotating manner on a rod running coaxially to the axis of rotation of the stripping head and co-rotating with the stripping head, on which rod the stationary drive motor acts, wherein the sloping face is preferably configured as a cone.

Preferably this embodiment of the invention is characterized in that the drive motor is coupled drivingly to a spindle which during rotation displaces a transverse yoke in the longitudinal direction along the spindle, wherein the rod with the sloping face is fixed in the longitudinal direction but mounted rotatably in this transverse yoke.

An embodiment according to the invention also comprises an apparatus in which the rod for the stripping blade or blades is guided coaxially and adjustably with respect to the rod for the centring jaws in the longitudinal direction.

Advantageously the apparatus according to the invention can be characterized in that the drive system, in particular the drive motor can be regulated in such a manner that a predefinable force can be applied to the conductor via the stripping blade or blades and/or the centring jaws.

A further embodiment according to the invention provides that a system for monitoring a parameter of the drive motor of the centring jaws is provided and is coupled to an evaluation unit which is designed to determine from the monitored parameter the extent of the motor actuations, furthermore the extent of the movement of the centring jaws and therefore the outside diameter of the conductor.

In order to solve the initially formulated object, a method for operating an apparatus according to any one of the preceding claims is further provided according to the invention. For this purpose, in the inner region of the rotary stripping head the apparatus is additionally provided with a stop for the end of the conductor as a trigger for the machining process. The method comprises the clamping of the conductor by means of the clamping jaws whereby the stripping head is set in rotation as well as the centring of the conductor by means of the centring jaws and the cutting into the cladding of the conductor by means of the at least one stripping blade.

According to the invention, this method is now characterized in that after insertion of the conductor into the stripping head the centring jaws are only closed so far that no complete fixing of the conductor takes place and then the cable end is detected with the trigger.

An alternative variant for a method for operating an apparatus according to one of the above approaches is provided for an apparatus which in the inner region of the rotary stripping head is additionally provided with a stop for the end of the conductor as a trigger for the machining process, comprising the clamping of the conductor by means of the clamping jaws whereby the stripping head is set in rotation as well as the centring of the conductor by means of the centring jaws.

This method is then characterized according to the invention in that following the incision, the separated insulation piece is drawn slightly forwards by means of the stripping blade or blades, the insulation piece is then clamped by means of the centring jaws and finally removed and twisted with a defined rotational speed of the stripping head.

Further advantages, features and details of the invention are obtained from the following description in which exemplary embodiments of the invention are described with reference to the drawings. In this case, the features mentioned in the claims and in the description can be essential to the invention each individually or in any combination.

DESCRIPTION OF THE DRAWING

The reference list is part of the disclosure. The figures are described cohesively and comprehensively. The same reference numbers denote the same components, reference numbers with different indices indicated functionally the same or similar components.

In the figures.

DESCRIPTION OF THE EMBODIMENTS

Figure 1:
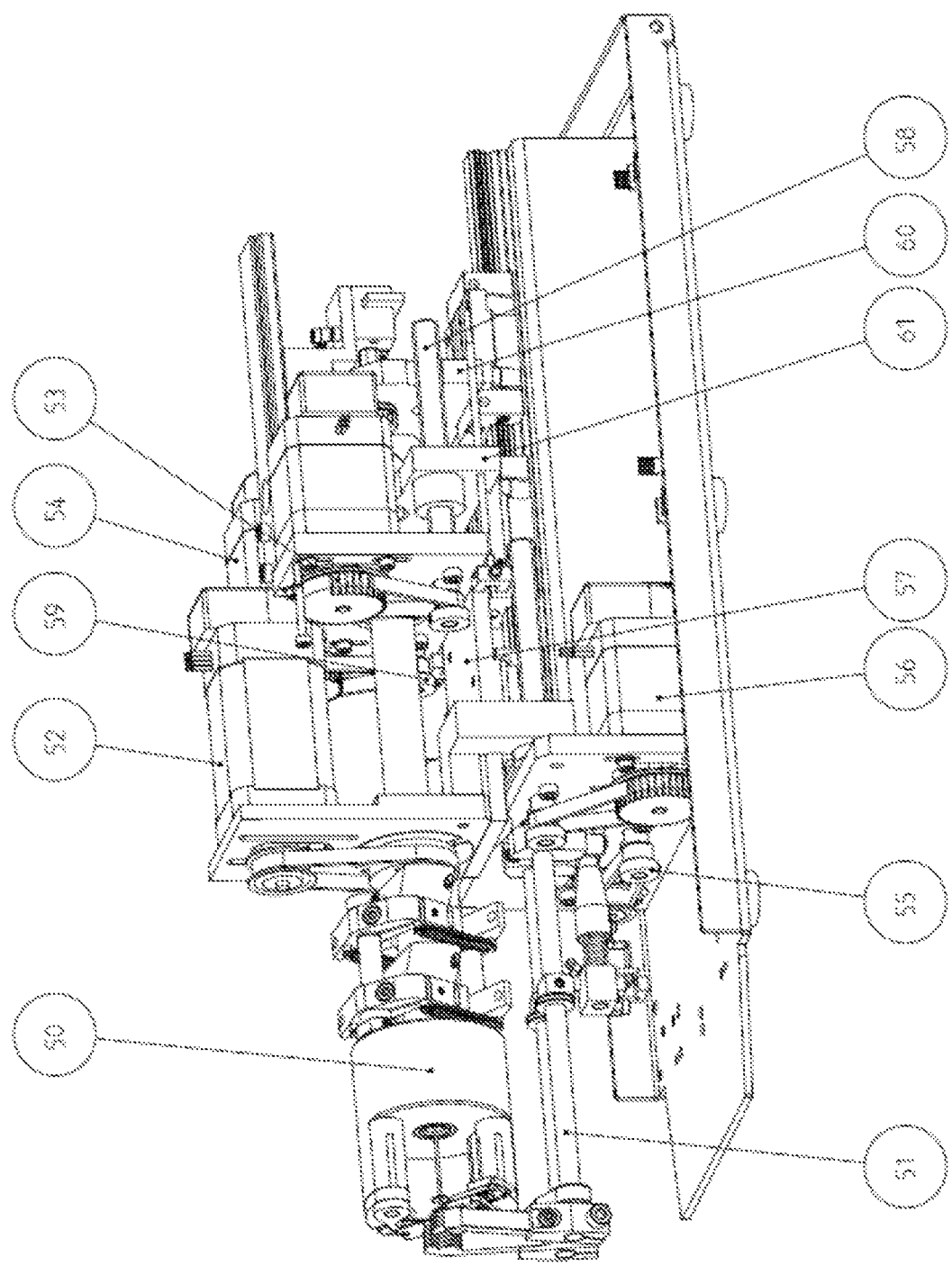
FIG. 1 shows an embodiment according to the invention of an apparatus for removing at least one layer of cladding from electrical conductors or light guides in an overview and FIG. 2 shows an embodiment according to the invention only of the actuating arrangement for the centring jaws and stripping blades of the apparatus from FIG. 1 in enlarged scale.
Figure 2:
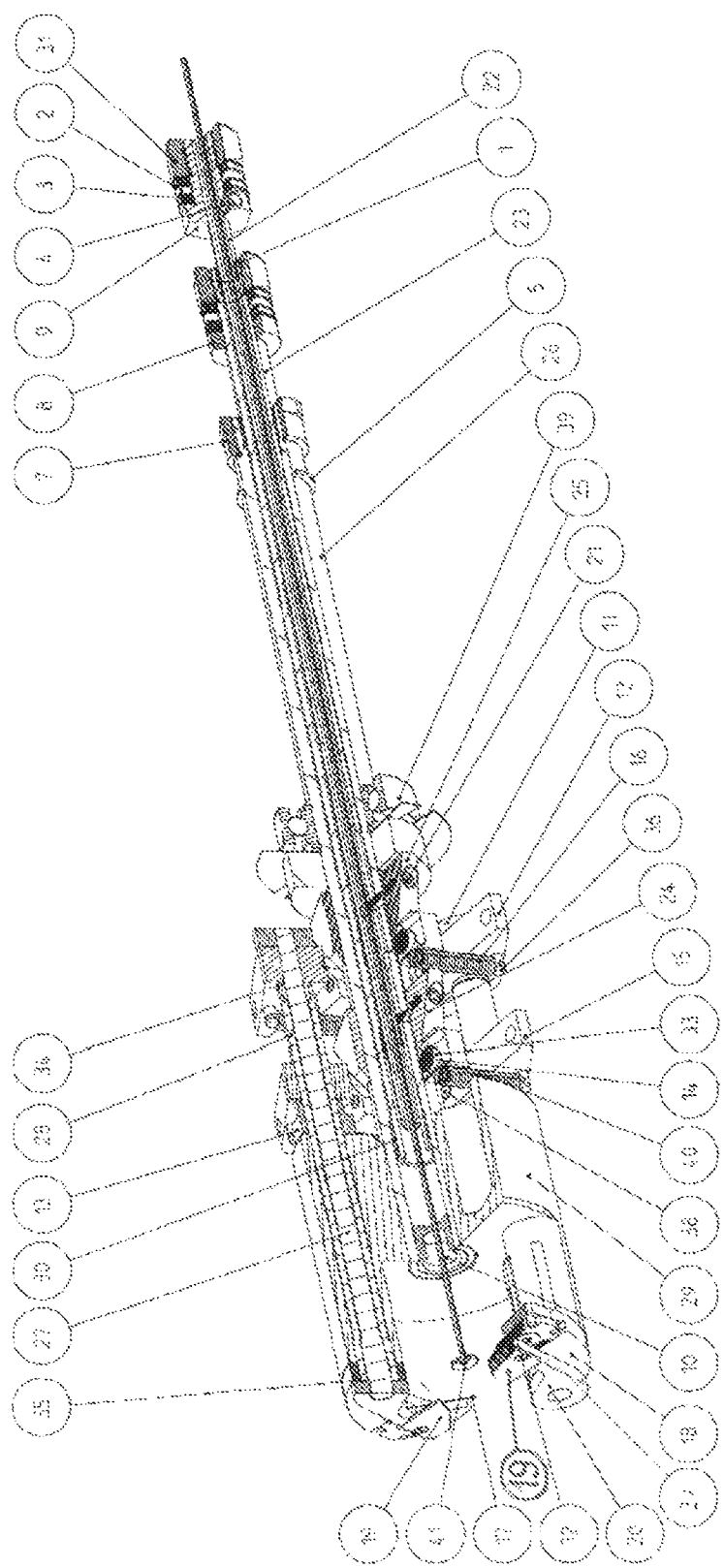

Typical apparatus for removing at least one layer of the cladding of electrical conductors or light guides are stripping machines or corresponding systems within larger cable processing machines. In addition to at least two clamping jaws of a clamping unit 51 which are movable radially to the conductor for fixing the conductor in the longitudinal direction, a rotary stripping head 50 is provided. In the stripping head 50 which can be set in rotation during operation by means of a drive motor 52, the centring of the conductor and the stripping take place, for which dedicated drives 53, 54 are provided. Likewise a separate drive 55 is provided for the clamping unit 51. A further drive 56 provides for the movement in the longitudinal axis of the stripping head 50 in which the conductor to be processed comes to lie in order to withdraw the separated piece of the cladding of the conductor axially from this.

At least one stripping blade 17 which can be rotated about the axis of rotation of the stripping head 50 and which is movable radially in relation to the axis of rotation are provided on the rotating body 29 of the stripping head 50 for cutting through at least one layer of the cladding of the conductor, and at least two centring jaws 19 which are movable radially in relation to the axis of rotation of the stripping head 50 and which are arranged directly at the blade or blades 17 are mounted for centring the conductor in the axis of rotation of the stripping head 50. The stripping blades 17 are also used for withdrawing the separated piece of the cladding of the conductor since they can be moved axially relative to the clamping unit 51, for which purpose they are preferably mounted on a motor-movable withdrawal carriage 57 or connected operatively to this.

The actuating action for the centring jaws is transmitted by the drive motor 54 via a first draw tube 22 in the direction of the stripping head 50. The actuating action for the stripping blade or blades is transmitted by the drive motor 53 via a second draw tube 23 in the direction of the stripping head 50. In this case, the first draw tube 22 is guided axially displaceably and relatively twistably, mounted for example by means of a plain bearing 1, inside the second draw tube 23. Both draw tubes 22, 23 are for their part guided axially displaceably and twistably relative thereto in the main shaft 26. The draw tube 23 for the blade actuation is mounted at the end opposite the stripping head 50 in an axial bearing 8 and the draw tube 22 for actuating the centring jaws is mounted in an axial bearing 9.

By means of the drive motor 52, the main shaft 26 which is mounted rotatably in a ball bearing 39 in the front region closer to the heavy stripping head, is set in rotation and thus also the body 29 mounted in non-rotating manner on the main shaft together with the elements of the drive systems mounted thereon for the centring jaws 19 or the stripping blades 17.

Stripping blades 17 preferably designed as sloping blades which are mounted on a blade holder 18 are used for the incision and also for withdrawal of the cladding of the conductor. This blade holder 18 constitutes a rotary lever which is mounted in non-rotating manner on a blade shaft 28. This blade shaft 28 runs parallel to the axis of rotation of the stripping head 50 and at the end facing away from the blade 17 carries a pressure lever 15 which is also mounted in non-rotating manner on the blade shaft 28.

In the same way each of the centring jaws 19 is mounted on a centring jaw holder 20 which is to be seen as a rotary lever, which for its part is mounted in non-rotating manner on a centring jaw shaft 27. The centring jaw shaft 27 also runs parallel to the axis of rotation of the stripping head 50 and at the end facing away from the centring jaw 19, carries a pressure lever 12 which is also mounted in non-rotating manner on the centring jaw shaft 27. In this case, the centring jaw shaft 27 runs coaxially inside the blade shaft 28 and is twistable relative to this.

A sloping face 25 in the form of an axially expanding cone, extending axially to the draw tube 22 and co-rotating with this, is fastened at the front end of the draw tube 22, i.e. that end which is located in the region of the stripping head 50, preferably within its dimensions. The end of the pressure lever 12 abuts against this sloping face, which end is deflected during an axial displacement of the sloping face 25 and thus also actuates the centring jaws 19 mediated via the centring jaw shaft 27 and is acted upon in the direction of the axis of rotation of the stripping head 50 with a force which can be predefined by the drive motor 54. The pressure lever 12 is further acted upon in the direction of the sloping face 25 by a spring element 16. This ensures a play-free actuation and during withdrawal of the sloping face 25 the spring element 16 again urges the pressure lever 12 into the initial position so that the centring jaws 19 again pivot outwards from the axis of rotation of the stripping head 50.

Another sloping face 24, extending axially with respect to the draw tube 23 and co-rotating with this, preferably also in the form of an axially expanding cone, is fastened to the front end of the other draw tube 23, here therefore at that end which is located in the region of the stripping head 50, preferably within its dimensions. The end of the other pressure lever 15 abuts against this sloping face 24, which end is deflected during an axial displacement of the sloping face 24 and thus also actuates the stripping blades 17 mediated via the blade shaft 28 and acts in the direction of the axis of rotation of the stripping head 50 with a force which can be predefined by the drive motor 53. The pressure lever 15 is further acted upon in the direction of the sloping face 24 by a spring element 40. This ensures a play-free actuation and during withdrawal of the sloping face 24 the spring element 16 again urges the pressure lever 12 into the initial position so that the stripping blades 17 again pivot outwards from the axis of rotation of the stripping head 50.

As a result of the independently actuatable drive motors 53 and 54 as well as the fact that the drive forces thereof are transmitted via the drive systems 22, 27, 12, 25, 20 or 23, 28, 15, 24, 18 relating to the force flow running parallel to the centring jaws 19 or stripping blades 17, the drive systems however are nevertheless completely independent in terms of their action and the centring jaws 19 can also be actuated completely independently of the stripping blades 17.

This embodiment according to the invention is preferably characterized in that the drive motors 53 and 53 are drivingly coupled to one of the spindles 58 and 59, which during rotation displaces one of the two transverse yokes 60 and 61 in the longitudinal direction along the spindles 58 and 59 where the rods 22 and 23 with the sloping faces 24 and 25 are fixed in the longitudinal direction with a mounting 8 and 9 but mounted rotatably in one of these transverse yokes 60 and 61.

At least the drive motors 53, 54 are preferably controllable in such a manner that a predefinable force can be applied to the conductor via the stripping blade or blades 17 and/or the centring jaws 19. Preferably a system for monitoring a parameter of the drive motor 54 of the centring jaws 19 is provided and coupled to an evaluation unit in which the extent of the motor actuation can be determined from this monitored parameter. From this the extent of the movement of the centring jaws 19 and thus the outside diameter of the conductor can then further be determined.

The machining process for a conductor with an encasing insulation using the apparatus explained above comprises firstly the clamping of the conductor by means of the clamping jaws of the clamping device 51, after which the stripping head 50 is set in rotation. This is followed by the centring of the conductor by means of the centring jaws 19 and cutting into the cladding of the conductor by means of the at least one stripping blade 17. After insertion of the conductor, the centring jaws 19 are advantageously closed so far that complete fixing of the conductor does not take place.

The actual stripping process is particularly advantageously initiated by impact of the front conductor end against a stop which is additionally provided in the inner region of the body 29 of the stripping head 50 as trigger.

As a result of the possibility of independent actuation for the centring jaws 19 and the stripping blades 17, a method can also be carried out in which following the incision, the separated insulation piece is drawn slightly forwards by means of the stripping blade or blades 17, then the insulation piece is clamped by means of the centring jaws 19 completely by abutting against this cut-off piece of the cladding of the conductor and then withdrawn and twisted at a defined rotational speed of the stripping head 50.

Further advantages which can be achieved with the apparatus explained above are:

The inner conductor can no longer be unintentionally twisted by the centring jaws.

No special centring jaws and harder centring springs are now required for intentional twisting of the inner conductor.

A more precise stripping length of the cable can be achieved if the cable is pre-centred with the centring jaws and then the cable end is detected with the trigger.

Both twisting and also precise stripping can now be carried out with the same machine.

The centring jaws can no longer damage the insulation, the shielding and the conductor during incision since the centring jaws are no longer coupled to the blades and thus no longer apply pressure.

REFERENCE LIST

1 Plain bearing
2 Counter disk
3 Axial ball race
4 Spec. screw
5 Securing ring
6 Insulating sleeve
7 Nut
8 Axial bearing "blade"
9 Axial bearing "centring"
10 Funnel
11 Axial fixing "centring jaws"
12 Centring jaw lever
13 Axial fixing "blade"
14 Bearing pin
15 Blade lever
16 Tension spring
17 Sloping blade
18 Blade holder
19 Centring jaw
20 Centring jaw holder
21 Spec. screw "centring jaws"
22 Draw tube "centring jaws"
23 Draw tube "blade"
24 Cone
25 Cone
26 Main shaft
27 Centring jaw shaft
28 Blade shaft
29 Body
30 Plain bearing
31 Securing nut
32 Countersunk screw
33 Ball bearing
34 Plain bearing
35 Adjusting washer
36 Half-length tapered-groove pin
37 Countersunk screw
38 Cylinder screw
39 Ball bearing
40 Tension spring
41 Trigger
50 Stripping unit
54 Centring axis
51 Clamping unit
55 Clamping axis
52 Axis of rotation
56 Withdrawal axis
53 cutting axis
57 Withdrawal carriage
58 Spindle
59 Spindle
60 Transverse yoke
61 Transverse yoke

The invention claimed is:

1. An apparatus for removing at least one layer of cladding from an electrical conductor or light guide (which electrical conductor or light guide is hereinafter generically referred to as a conductor), comprising:
at least two clamping jaws which are configured to move towards a conductor so as to fix the conductor in a longitudinal direction;
a rotary stripping head that includes at least one stripping blade which is configured to rotate about an axis of rotation of the stripping head and to move radially towards and away from said rotation axis so as to cut through at least one layer of cladding of the conductor;
at least two centring jaws which are arranged proximately to the at least one stripping blade and which are configured to: (i) move radially towards and away from said axis of rotation so as to center the conductor on said rotation axis, (ii) rotate about the axis of rotation of the stripping head, and (iii) actuate independently of the at least one stripping blade as they move radially towards and away from said axis of rotation;
a first drive system configured to drive the at least two centring jaws;
a second drive system configured to drive the at least one stripping blade, which second drive system is actuatable independently of said first drive system; and
a withdrawal carriage which is configured to be moved substantially parallel to said rotation axis, said at least one stripping blade and said second drive system being mounted on, or operatively connected to, said withdrawal carriage.

2. The apparatus according to claim 1, wherein said first drive system includes a first drive motor coupled to said at least two centring jaws via a first actuating arrangement configured to transmit the drive force of the first motor to said at least two centring jaws, and said second drive system includes a second drive motor coupled to said at least one stripping blade via a second actuating arrangement configured to transmit the drive force of the second motor to said at least one stripping blade.

3. The apparatus according to claim 2, wherein said first actuating arrangement includes a first rotary lever which carries one of said at least two centring jaws and which is attached in a non-rotating manner to a first shaft, and wherein said second actuating arrangement includes a second rotary lever which carries one of said at least one stripping blade and which is attached in a non-rotating manner to a second shaft, each of said first and second shafts being arranged parallel to said axis of rotation and located radially at a distance therefrom, which first shaft is configured to be actuated by said first drive motor and which second shaft is configured to be actuated by said second drive motor.

4. The apparatus according to claim 3, wherein said first and second shafts are coaxial with one another and are configured to be rotated relative to one another.

5. The apparatus according to claim 4, wherein said first actuating arrangement also includes a first pressure lever, mounted in a non-rotating manner on said first shaft, and which is configured to cooperate with a first sloping face extending coaxially with said axis of rotation, said first sloping face configured to co-rotate with said first pressure lever and to be axially adjustable in the direction of said axis of rotation by said first drive motor, and wherein said second actuating arrangement also includes a second pressure lever, mounted in a non-rotating manner on said second shaft, and which is configured to cooperate with a second sloping face extending coaxially with said axis of rotation, said second sloping face configured to co-rotate with said second pressure lever and to be axially adjustable in the direction of said axis of rotation by said second drive motor.

6. The apparatus according to claim 5, wherein said first actuating arrangement further includes a first elastic element connected to said first pressure lever and which is configured to subject said first pressure lever to a force in the direction of the first sloping face, and wherein said second actuating arrangement further includes a second elastic element connected to said second pressure lever and which is configured to subject said second pressure lever to a force in the direction of the second sloping face.

7. The apparatus according to claim 6, wherein said first elastic element includes a first tension spring and said second elastic element includes a second tension spring.

8. The apparatus according to claim 6, wherein said first sloping face is mounted in a non-rotating manner on a first rod that is arranged coaxially with said axis of rotation and configured to co-rotate with said rotary stripping head, said first rod being connected to, and configured to be acted upon by, said first drive motor, and wherein said second sloping face is mounted in a non-rotating manner on a second rod that is arranged coaxially with said axis of rotation and configured to co-rotate with said rotary stripping head, said second rod being connected to, and configured to be acted upon by, said second drive motor.

9. The apparatus according to claim 8, wherein said first sloping face includes a first cone and said second sloping face includes a second cone.

10. The apparatus according to claim 8, wherein said first actuating arrangement still further includes a first spindle connected to said first drive motor, which first spindle is configured to displace a first transverse yoke in a first longitudinal direction along said first spindle, said first rod being fixed in the first longitudinal direction but rotatably mounted in the first transverse yoke, and wherein said second actuating arrangement still further includes a second spindle connected to said second drive motor, which second spindle is configured to displace a second transverse yoke in a second longitudinal direction along said second spindle, said second rod being fixed in the second longitudinal direction but rotatably mounted in the second transverse yoke.

11. The apparatus according to claim 8, wherein said second rod is configured to be guided coaxially and adjustably with respect to said first rod in a longitudinal direction.

12. The apparatus according to claim 11, wherein the first drive motor is configured so that during operation a predefined force is delivered to the at least two centring jaws and wherein the second drive motor is configured so that during operation a predefined force is delivered to the at least one stripping blade.

13. The apparatus according to claim 12, further comprising a monitoring system connected to, and configured to monitor at least one parameter of, the first drive motor, which monitoring system is also connected to an evaluation unit that is configured to determine from the at least one parameter the extent of the actuations of said first drive motor and therefore the movements of the at least two centring jaws and/or an outside diameter of the conductor.

14. An apparatus for removing at least one layer of cladding from an electrical conductor or light guide (which electrical conductor or light guide is hereinafter generically referred to as a conductor), comprising:

at least two clamping jaws which are configured to move towards a conductor so as to fix the conductor in a longitudinal direction;

a rotary stripping head that includes at least one stripping blade which is configured to rotate about an axis of rotation of the stripping head and to move radially towards and away from said axis of rotation so as to cut through at least one layer of cladding of the conductor;

at least two centring jaws which are arranged proximately to the at least one stripping blade and which are configured to move radially towards and away from said axis of rotation so as to center the conductor on said axis of rotation, and where the at least two centring jaws are actuated independently of the at least one stripping blade as they move radially towards and away from said axis of rotation;

a first drive system configured to drive the at least two centring jaws;

a second drive system configured to drive the at least one stripping blade, which second drive system is actuatable independently of said first drive system; and a withdrawal carriage which is configured to be moved substantially parallel to said axis of rotation, said at least one stripping blade and said second drive system being mounted on, or operatively connected to, said withdrawal carriage, wherein:

said first drive system includes a first drive motor coupled to said at least two centring jaws via a first actuating arrangement configured to transmit the drive force of the first motor to said at least two centring jaws, and said second drive system includes a second drive motor coupled to said at least one stripping blade via a second actuating arrangement configured to transmit the drive force of the second motor to said at least one stripping blade, said first actuating arrangement includes a first rotary lever which carries one of said at least two centring jaws and which is attached in a non-rotating manner to a first shaft, and wherein said second actuating arrangement includes a second rotary lever which carries one of said at least one stripping blade and which is attached in a non-rotating manner to a second shaft, each of said first and second shafts being arranged parallel to said axis of rotation and located radially at a distance therefrom, which first shaft is configured to be actuated by said first drive motor and which second shaft is configured to be actuated by said second drive motor, and said first and second shafts are coaxial with one another and are configured to be rotated relative to one another.

\* \* \* \* \*